Sept. 2, 1941. P. J-M. T. ALLARD 2,255,033
GRAB
Filed Feb. 14, 1939 5 Sheets-Sheet 1
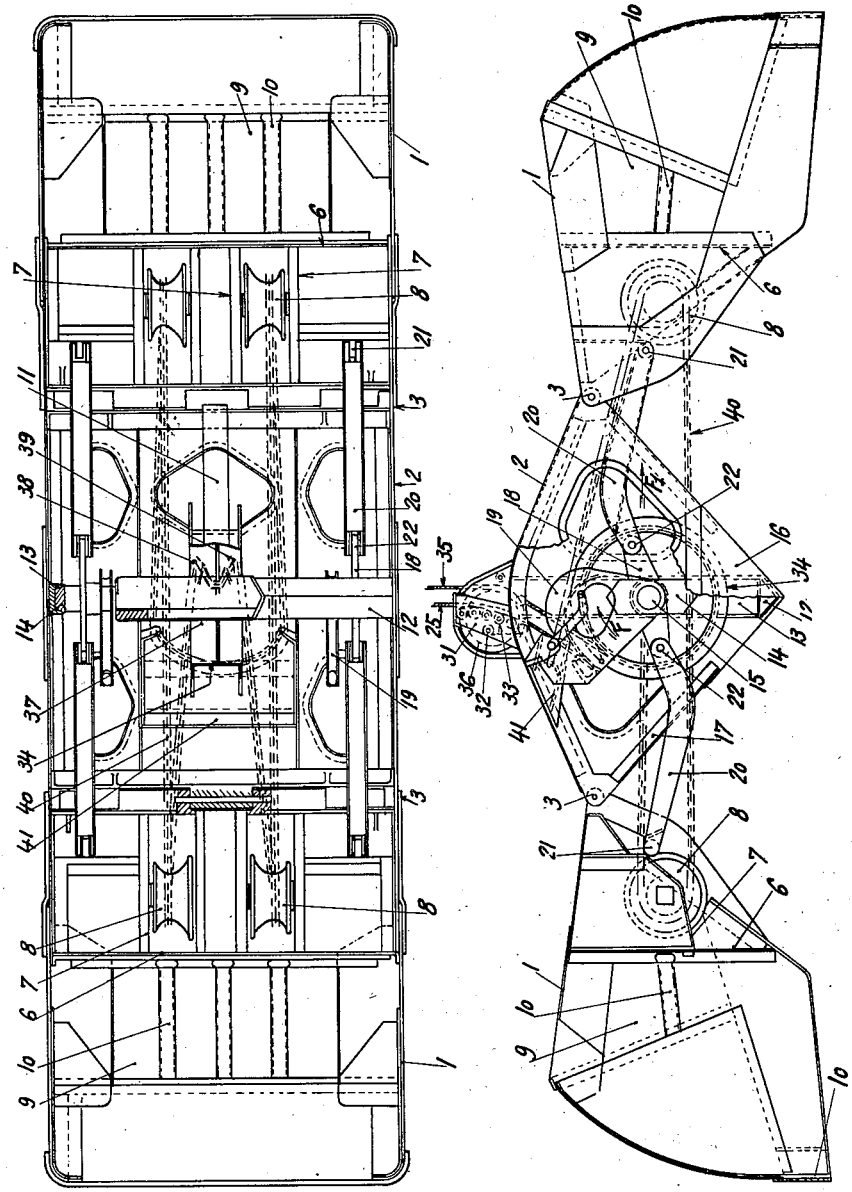

Sept. 2, 1941. P. J-M. T. ALLARD 2,255,033
GRAB
Filed Feb. 14, 1939 5 Sheets-Sheet 2
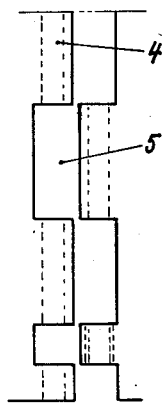
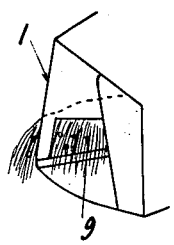
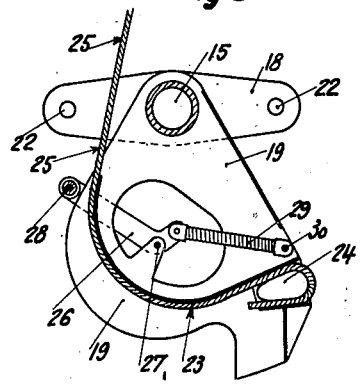
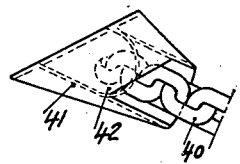
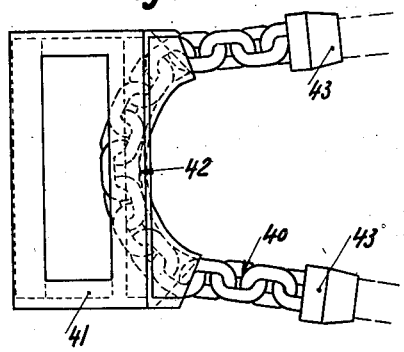
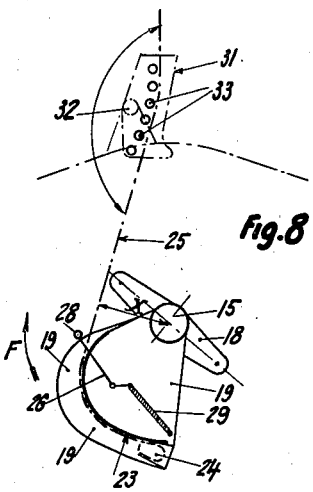
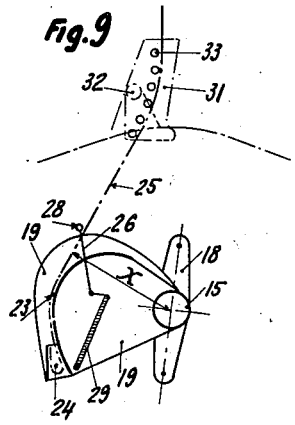
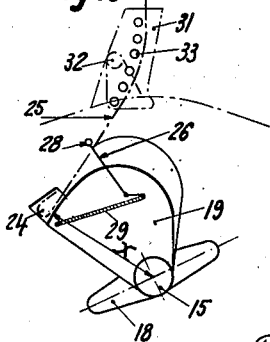
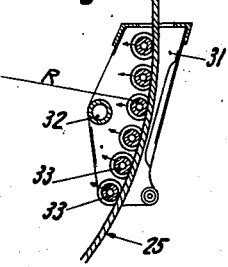

Sept. 2, 1941. P. J-M. T. ALLARD 2,255,033
GRAB
Filed Feb. 14, 1939 5 Sheets-Sheet 4

Inventor
P. J. M. T. Allard
By: Glascock Downing & Seebold
Attys.

Sept. 2, 1941. P. J-M. T. ALLARD 2,255,033
GRAB
Filed Feb. 14, 1939  5 Sheets-Sheet 5

Inventor,
P.J.M.T. Allard

Patented Sept. 2, 1941

2,255,033

UNITED STATES PATENT OFFICE 2,255,033

GRAB

Pierre Jean-Marie Theodore Allard, Le Havre, France, assignor to Societe Francaise de Construction de Bennes Automatiques, Graville-Le Harve, France, a French company Application February 14, 1939, Serial No. 256,391
In France December 23, 1938

5 Claims. (Cl. 37—187)

The present invention relates to a grab having a great spread.

Grabs of this class which are already in use comprise a central body containing a mechanism for opening the scoops, and a second mechanism which is independent from the first one and serves for closing these scoops. The scoops are pivoted to the main body at two separate points, so that when the grab is entirely open, its spread is equal to the sum of the lengths of the two scoops and of the central body. On the contrary, when the grab is closed, its height is simply equal to the height of this body or practically to the length of one of the scoops. This embodiment provides for a grab which is very long and very low when in the open position, and in which the height does not increase during the closing.

In grabs of this class, the opening mechanism generally consists of links which are pivoted to the scoops and also to a suitable actuating device such as a drum or a sector, while the closing mechanism, consists of auxiliary chains or cables passing over pulleys which are secured to the scoops.

The present invention relates to improvements in this class of grab and also provides for a possibility of practically using these grabs with all classes of lifting apparatus.

In the accompanying drawings, which are given solely by way of example:

Fig. 1 is an elevational view, partly in section, of an open grab according to the invention;

Fig. 2 is a corresponding bottom plan view;

Fig. 3 is a detail view of the hinges;

Fig. 4 is a detail view of a scoop;

Fig. 5 shows an opening sector;

Figs. 6 and 7 are elevational and plan views of a balancing chain-guide;

Figs. 8 to 10 are diagrammatic views showing the different positions assumed by the sector and the thereto pertaining members during the opening of the scoops;

Fig. 11 is a detail view of the issue box guiding the opening cable;

Figure 12:
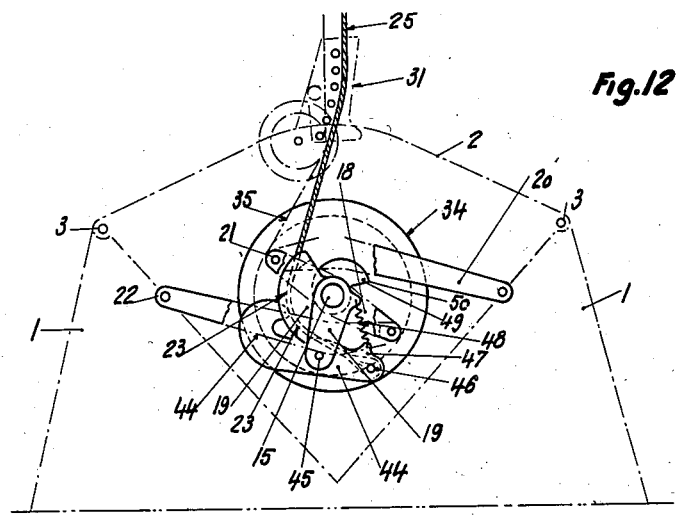
Figs. 12 and 13 are diagrammatic elevational and plan views of a locking system provided on the grab.
Figure 13:
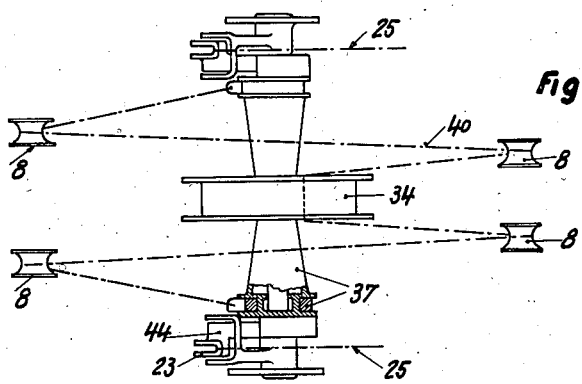

In the embodiment shown in Figs. 1 to 11, the grab which is of the type known per se, comprises two scoops 1 which are pivoted at 3 to a central body 2.

The pivots 3 are placed at the two opposite ends of body 2, thus providing for a great length of the opened grab. In fact, in the open position, the length of the grab results of the length of the two scoops themselves added to the length of body 2, while in the closed position, the height of the grab is practically equal to the length of one of the scoops placed in the vertical position.

In this manner the grab has a great spread, while having but a small height when closed.

Scoops 1 are preferably pivoted to body 2 by means of multiple hinges 3 having male parts 4 and female parts 5 (Fig. 3), made for instance of ribbed steel.

Each scoop is provided with a sheet-metal screen 6 which is secured to its top and sides (Fig. 1).

The object of this screen is to stiffen the scoops and also to cover the opening and closing mechanisms and to prevent the pieces of goods which are handled from clogging and damaging these mechanisms.

Upon screen 6 are secured flaps 7 which extend up to the scoop-pivots.

Between these flaps are mounted pulleys 8.

The edges of the scoops are reinforced (Fig. 1), and this further stiffens the scoops and prevents them from being damaged, when during the closing operation, a large piece of goods is jammed between them and body 2.

In a known manner and in order to prevent any undue stresses, the scoops are provided with discharge holes 9 (Figs. 2 and 4) of suitable form located at the proper height, so as to avoid a heavy overload on the grab as well as abnormal stresses due to an excessive filling of the scoops.

These said apertures or holes 9 may be provided with bars 10 for the discharge of fine material, but when the grab is handling goods consisting of blocks, they will hold the same inside the scoops.

This arrangement is of great importance, as a single grab can now be used for goods having different consistency without overloading the lifting apparatus. It is also possible, when handling fine and very light goods, to close these apertures by any suitable and known means.

The structure of the central body 2 is furthermore reinforced by the provision of a series of members which will now be described.

Bracing members 11 starting from hinges 3 connect these latter with a central cross-piece 12 situated at the lower part of body 2 thus forming a rigid structure.

A heavy U iron bar 13 is mounted on the shaft of body 2 (Figs. 1 and 2) and is provided with bearings 14 supporting a shaft 15 on which are mounted the opening and closing mechanisms which will be further described.

A triangular reinforcing piece 16 is secured to bar 13 and also to the cross-piece 12.

Angle-iron members 17 mounted at the edges of the sheet metal forming the side flanges of the central body serve to reinforce the whole apparatus.

The opening mechanism of the grab consists of sectors 19 provided with auxiliary members 18 mounted on central shaft 15 and actuating links 20 which are pivoted at one end to scoops 1 at 21 and at the other end to members 18 of sectors 19 at 22.

Sectors 19 (Figs. 1 and 5) also have a curved part 23 and an attaching piece 24 for the opening cables 25 of the grab.

The said cables are guided in the curved part of sector 19 by an elastic reaction system which preferably consists of a lever 26, pivoted at 27 and carrying at one end a roller 28.

This lever is urged into the position shown in Fig. 5 by a spring 29 attached at 30.

It is evident that each grab will have two sectors 19 and two auxiliary members 18, as well as two pairs of links 20 which are mounted on the respective sides of the vertical plane of symmetry of the grab.

The opening cable 25 proceeds to the upper part of the grab and into an issue box or a guide 31 which is pivoted at 32 and contains rollers 33, located on a circle the radius of which is R (Figs. 1 and 11).

On central shaft 15 of the grab is mounted a drum 34, termed main closing drum. The central part of this drum serves for the winding of the closing rope or ropes 35, which pass upon pulleys 36. Two other auxiliary drums 37 of smaller diameter are mounted on both sides of drum 34 and are secured thereto.

Drum 34 has two attaching points 38 and 39 for securing an auxiliary closing chain 40. This latter chain 40 passes successively over pulleys 8 which are mounted between flanges 7 and are in opposite position, and then into a balancing chain-carrier or chain-guide 41, supported by central body 2 (Figs. 6 and 7).

This chain-guide comprises a channel 42 containing the two strands of the closing chain 40. These latter can thus pass freely in this channel, and the stresses to which they are subjected during the closing of the grab are uniformly distributed, and thus these chains are not subjected to abnormal stresses.

Balls or like members 43 can be mounted on both strands of chains 40 and serve to limit the movement of said chains in channel 42 in such way, that if one of these chains breaks the corresponding ball comes in contact with the opening of channel 42, the movement of the chain is stopped and the grab is prevented from a sudden opening.

The operation of the grab is as follows:

When it is desired to close the grab, opening cables 25 are given a certain slack, and they are unwound from drum 34, thereby rotating this latter and causing the winding of the closing chains 40 on the auxiliary drums 37.

Chains 40 act then upon pulleys 8 mounted on scoops 1, thus closing the grab.

The grab is opened by suspending it by opening cables 25 which are attached to opening sectors 19 and rotate these latter in the direction of arrow F. The sectors drive links 20 in the direction of arrow $F_1$, thus opening scoops 1.

This operation of the grab permits of distinguishing the opening stage performed by links 20 and the closing stage performed by chains 40. The very important improvements according to this invention reside in provision of guiding means of a particular type (issue box 31, channel 42 and system 26–28–29) which permit of very successfully guiding cables 25 and 40.

Figs. 8 to 10 show the different positions of guiding means 26 to 30 during the opening.

At the start of the opening movement (Fig. 8), the force transmitted by cables 25 is exerted upon a lever arm X which is relatively short. These are normal opening conditions, as at this time the grab offers no great resistance when being opened due to the position of the centre of gravity of the scoops which furthers the opening movement. The weight of the goods contained in the scoops also acts in the same direction.

During the opening movement of the scoops, the sectors describe an arc of a circle about their pivoting point. The lever arm X which is acted upon by cables 25 will thus gradually increase, as shown in Figs. 9 and 10, and it reaches a maximum value when the grab is entirely open, i. e., when the resistance of the scoops itself reaches a maximum.

This feature is of interest, as it should be noted that when a grab of this type is opened, the movement of these cables 25 which have to be braked, with reference to the grab will be entirely due to the descent of the grab. It is preferable that this descending movement should be as small as possible, in order that the operator shall not be obliged to open the grab at a great height and to a sufficient degree to allow the complete spreading of the scoops. In fact, this can damage certain goods, and especially coal for household use, which should not fall from a great height and should not be reduced to powder.

During the opening movement, it is further necessary to observe the function of the device guiding the opening cables and which holds them in channel 23 of the sector. In fact, this is very important for the reason that when the opening cables are slack, they must remain in this channel, and must not exert abnormal stresses on the opening sectors 19 when they are again stretched. During the opening movement, when cable 25 makes contact with roller 28 (Fig. 9), this latter is applied against the cable by spring 29, and according as the cable moves along, the roller will stretch the spring until reaching the position shown in Fig. 10.

It is evident that when the opening cables become slack, the spring will act upon roller 28, and thus the cable will be wound upon the sector.

The opening cables 25 are guided by the special issue boxes 31 (Fig. 11) which are pivotally supported at the top of the central body. The cables which are in contact with the set of rollers 33 exert pressures upon these latter which are equally distributed on the respective sides of the spindle 32, and thus the load is distributed upon several rollers according to the value of the angle formed by the vertical line with the cable passing through the issue box. This box will be automatically balanced and rotated, and thus the load upon the rollers will be distributed in a most uniform way.

This device also affords a large radius R for winding the cable, and thus the wear of the cable is still reduced.

Figs. 12 to 15 show the grab provided with a locking device by which the scoops of the grab can be held in the open position.

The grab as a whole is the same as the one shown in Figs. 1 and 2, and the opening and closing mechanisms are the same as those shown in these figures and also in Figs. 3 to 11.

In this form of construction, the sector 19 comprises a pawl 44, or like member, which is pivoted at 45. The opening cable 25 is attached to the pawl at 46, instead of being secured to sector 19 as in the preceding case. The pawl comprises a fork 47 on which is attached a spring 48 which holds the said pawl in the position shown in Fig. 12. The pawl is mounted on the side of the channel 23 and above the ends of the journals 37 of the closing drum 34.

A ratchet 49 is provided on the end of each journal and is situated just below the pawl 44.

As shown in Figs. 1 to 11, the closing mechanism consists of chains, cables or ropes 40 passing over pulleys 8 mounted on the scoops.

The operation of this device is as follows.

The grab being supposed closed (Fig. 12), when it rests upon the opening cables 25, these latter actuate sectors 19 which drive the links 20 back and spread out the scoops 1.

The cables 25 then rest on the bottom of the channels 23 of the sectors 19, and the stress of the cables is exerted according to an axis which is situated below the pivoting axis 45 of the pawl 44. This latter is thus held in the position shown in Fig. 12.

Figure 14:
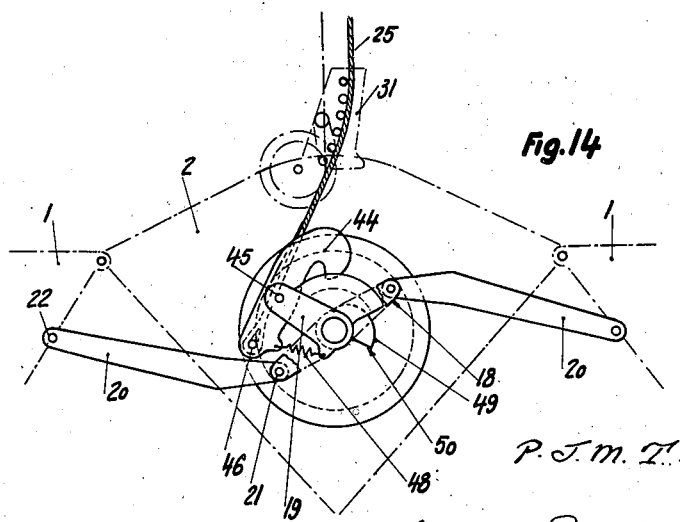
Figs. 14 and 15 show two other positions of the last mentioned mechanism.

During the opening operation, when the sector has covered a part of its course and reaches the position shown in Fig. 14, the cables 25 leave the bottom of the channel 23 of the sector 19, and their force is directed along the pivoting axis of the pawl 45.

Figures 15, 19, 20:
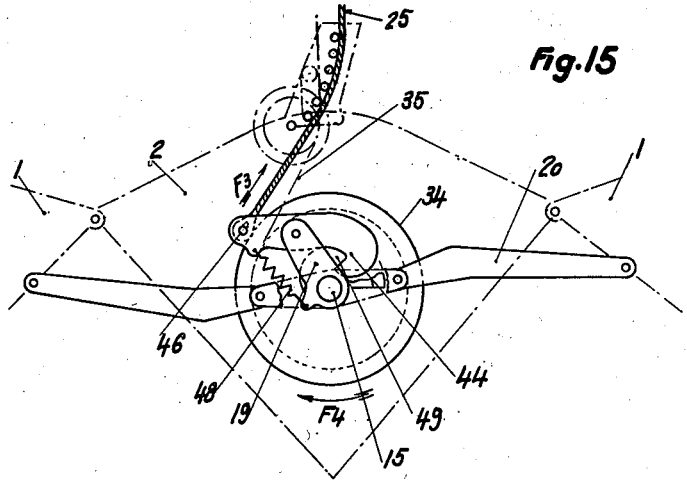
Figs. 16 to 20 show another embodiment of the invention.
Figure 16:
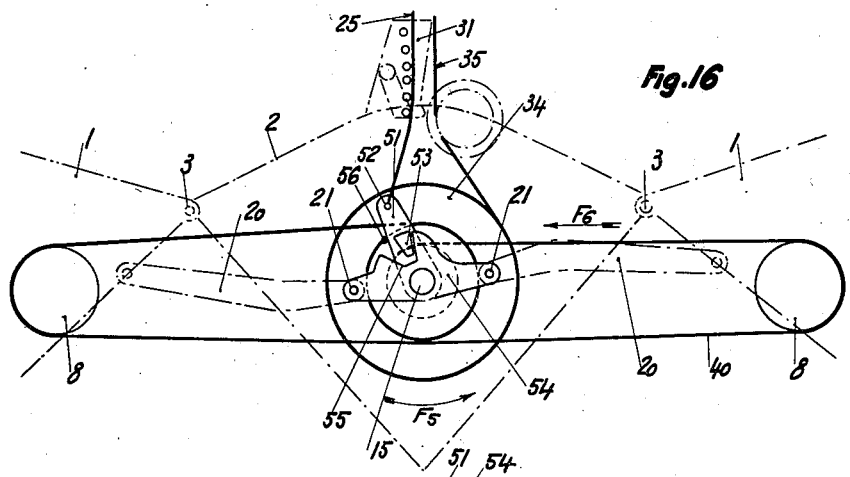
Figure 17:
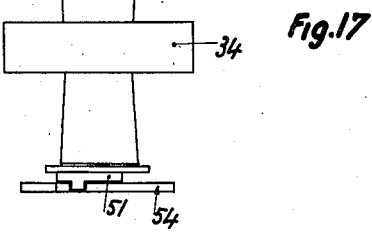

When the direction of the force exceeds this limit, the opening cable 25 draws upon the securing pin 46 and tends to pivot the pawl in the direction of the arrow F3 (Fig. 15).

The pawl then makes contact with the inclined part 50 of the ratchet 49. At this time the grab is open and the position of the ratchet is so determined that the pawl will engage in the rear of the ratchet tooth, as shown in Fig. 15.

With the grab entirely open, if a traction is exerted upon closing cable 35, this cable will rotate drum 34 in the direction of arrow F4. Ratchet 49 now makes contact with pawl 44 and tends to move it in the direction of arrow F4.

The force of the lifting cable is thus transformed into a force tending to open the grab by means of pawl 44, sector 19, ratchet 49 and links 20.

The grab is then operated by the lifting cable, and can be brought above the goods in the open position.

When it rests upon the goods, and when lifting cable 35 becomes slack and drum 34 tends to turn in a direction contrary to arrow F4, pawl 44, which is urged by spring 48, is then disengaged from ratchet 49, and the closing mechanism is released. When a traction is now exerted upon cable 35, this latter causes the closing of the grab, as above stated.

This type of grab may also be provided with a mechanism permitting its use with double-drum winches in which the drums are driven by separate motors, or with winches having differential devices. With this type of winch, it is not possible to accurately regulate the starting of the cable or cables used to open the grab. It often happens that the opening cables will draw upon the grab before it is entirely closed.

Figs. 16 to 20 show a device by which this drawback is obviated.

In this construction, the opening and closing devices are so arranged that when a traction is exerted upon the opening cable or cables before the grab is entirely closed, this will aid in finishing the closing movement.

The chain or chains 40 which act in the direction for closing the scoops and are wound on the ends of the drum actuated by the closing cable or cables 35, are secured at their ends 56 to sectors 51 adapted to turn loosely on shaft 15. To these sectors are also attached, at 52, the opening cables 25 for the grab. The said sectors comprise a boss (or a tappet) 53, and after a determined degree of rotation of the sector 51, said boss will meet, and thus rotate, a second sector 54 which is connected with the links 50 by which the scoops are opened.

The said boss 53 is movable in a recess 55 formed in the support of the opening links 54.

The opening sector can thus freely oscillate between the two stops formed by the said recess in the support 54, without acting upon the links 20 used to open the grab.

The operation is as follows:

With the grab placed over the goods in the open position, the opening cable 25 being slack, if a traction is exerted upon the closing cable 35, this latter will turn the drum 34 in the direction of arrow F5, and thus the chain will be wound in the direction of arrow F6.

The traction exerted by the chain 40 at the point 56 at which it is attached to the opening sector 51, will bring the boss 53 into contact with one side of recess 55 in support 54.

Figure 18:
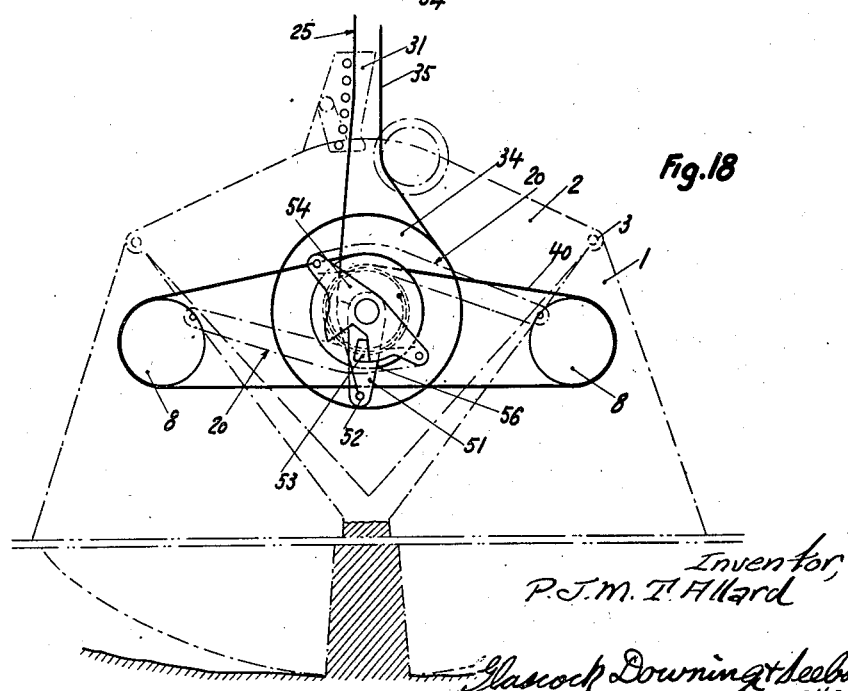

The entire mechanism will now have the position shown in Fig. 18.

This position remains the same, if the grab closes and if opening cables 25 do not exert a premature traction upon sectors 51.

On the contrary, if the opening cables have a tendency to lift the grab before it is entirely closed, their force is transmitted to sector 51, which moves between the flanges of recess 55 and finally draws upon chain 40 in the direction of arrow F7, thus aiding in the closing of the grab.

For the opening of the scoops, the operation follows the usual cycle, except that the grab slightly descends when the opening commences, which descent corresponds to the slack given to the cables by reason of the movement of the boss 53 between the sides of the recess 55.

Obviously, the invention is not limited to the embodiments herein described and represented, which are given solely by way of example.

Having now described my invention, what I claim as new and desire to secure by Letters Patent is:

1. In a grab of the type having a central body, two scoops pivotally secured to said body at two distinct and opposite points thereof, a mechanism for closing these scoops and grasping the goods to be handled, comprising a main closing drum in said body, auxiliary drums, flexible means such as a rope wound on said auxiliary drums, and pulley means for said rope disposed on said scoops, and a usual closing rope for actuating said main drum, an opening mechanism contained in said body and comprising a rotatable sector-like part operated by the usual opening flexible means such as a rope, and links pivotally secured to said sector-like part and to said scoops, said rotatable sector-like part comprising an extension, channel means on this extension adapted to contain and to guide the usual opening flexible means of the grab, such as a rope, and an elastic reaction means adapted to maintain the opening rope in said channel means during the movements of said rotatable sector-like part.

2. In a grab of the type having a central body, two scoops pivotally secured to said body at two distinct and opposite points thereof, a mechanism for closing these scoops and grasping the goods to be handled, comprising a main closing drum in said body, auxiliary drums, flexible means such as a rope wound on said auxiliary drums, and pulley means for said rope disposed on said scoops, and a usual closing rope for actuating said main drum, an opening mechanism contained in said body and comprising a rotatable sector-like part operated by the usual opening rope and links pivotally secured to said sector and to said scoops, said rotatable part comprising an extension, channel means on this extension adapted to contain and to guide the usual opening rope of the grab and an elastic reaction means adapted to maintain the opening rope in said channel means during the movements of said rotatable sector, said elastic reaction means comprising at least one roller, an oscillating member carrying this roller and a spring acting thereupon.

3. In a grab of the type comprising a central body, two scoops pivotally secured to said body at two distinct and opposite points thereof, a mechanism for closing these scoops and grasping the goods to be handled, comprising a main closing drum in said body, auxiliary drums, flexible means such as a rope wound on said auxiliary drums, a pulley means for said rope disposed on said scoops, and a usual closing rope for actuating said main drum, an opening mechanism contained in said body and comprising a rotatable sector-like part operated by the usual opening rope and links pivotally secured to said sector and to said scoops, and an issue box for the usual opening rope of the grab, said latter issue box being pivotally supported by said central body and comprising a series of guiding rollers disposed substantially according to a circle.

4. A grab according to claim 1, wherein said flexible means passing on said auxiliary drums are provided with an abutment member adapted to engage a suitable part of said central body, to stop the unwinding of said flexible means and to avoid the opening of the grab in the case of a breakage of these flexible means.

5. In a grab of the type having a central body, two scoops pivotally secured to said body at two distinct and opposite points thereof, a mechanism for closing these scoops and grasping the goods to be handled, comprising a main closing drum in said body, auxiliary drums, flexible means such as a rope wound on said auxiliary drums, and pulley means for said rope disposed on said scoops, and a usual closing rope for actuating said main drum, an opening mechanism contained in said body and comprising a rotatable sector operated by the usual opening rope and links pivotally secured to said sector and to said scoops, said flexible means of said auxiliary drums being secured at their two ends to two different points of the main closing drum and being arranged so as to follow paths which have a symmetrical arrangement with reference to the vertical longitudinal plane of the grab, and channel means provided in said body, traversed by said flexible means and adapted to balance the stresses exerted upon the two strands of said flexible means, said rotatable sector comprising an extension, channel means on this extension adapted to contain and to guide the usual opening rope of the grab and an elastic reaction means adapted to maintain the opening flexible means in said channel means during the movements of said rotatable sector, said elastic means comprising at least one roller, a lever carrying said roller and a spring causing said roller to bear upon said rope, further an issue box for the usual opening rope of the grab, said latter box being pivotally supported by said central body and comprising a series of guiding rollers disposed practically according to a circle, a locking device for maintaining the grab in the open position as long as it does not rest upon the goods which are to be handled, and means for releasing said locking device when the opening and closing ropes are relieved of the weight of the grab.

PIERRE JEAN-MARIE THEODORE ALLARD.